(12) United States Patent
Eker et al.

(10) Patent No.: US 10,182,019 B2
(45) Date of Patent: Jan. 15, 2019

(54) INTERCONNECTED HARDWARE INFRASTRUCTURE RESOURCE CONTROL

(71) Applicant: Telefonaktiebolaget LM Ericsson (publ), Stockholm (SE)

(72) Inventors: Johan Eker, Lund (SE); Enrico Bini, Lucca (IT); Bengt Lindoff, Bjärred (SE); Victor Millnert, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 250 days.

(21) Appl. No.: 15/204,164

(22) Filed: Jul. 7, 2016

(65) Prior Publication Data

US 2017/0250923 A1  Aug. 31, 2017

Related U.S. Application Data

(60) Provisional application No. 62/299,953, filed on Feb. 25, 2016.

(51) Int. Cl.
*H04L 12/24* (2006.01)
*H04L 12/26* (2006.01)
(Continued)

(52) U.S. Cl.
CPC .......... *H04L 47/801* (2013.01); *G06F 9/5077* (2013.01); *H04L 41/0803* (2013.01);
(Continued)

(58) Field of Classification Search
CPC ............... H04L 47/801; H04L 43/0894; H04L 41/0803; H04L 41/0896; H04L 47/823; G06F 9/5077
See application file for complete search history.

(56) References Cited

U.S. PATENT DOCUMENTS 6,744,768 B2 †  6/2004  Vikberg
7,280,490 B1 †  10/2007  Hauck
(Continued)

OTHER PUBLICATIONS

Choisi, M., et al., "Network Functions Virtualisation," SDN and OpenFlow World Congress, Darmstadt, Germany, Oct. 22, 2012, pp. 1-16, available @ http://portal.etsi.org/NFV/NFV_White_Paper.pdf.

(Continued)

*Primary Examiner* — Patrice L Winder
(74) *Attorney, Agent, or Firm* — Coats & Bennett, PLLC

(57) ABSTRACT

A physical network node controls allocation and/or deallocation of resources of an interconnected hardware infrastructure. The physical network node determines a number of requests currently queued at a first service node of a plurality of serially-connected service nodes at a current time. The plurality of serially-connected service nodes supports a packet flow using resources of the interconnected hardware infrastructure. The physical network node also determines a packet flow rate of the packet flow into the first service node. The physical network node also determines a future time to control allocation or deallocation of a resource of the interconnected hardware infrastructure to a second service node of the plurality of serially-connected service nodes based on the determined number of requests and the determined packet flow rate. The physical network node controls allocation or deallocation of the resource to the second service node at the future time.

20 Claims, 7 Drawing Sheets

(51) Int. Cl.
  *H04L 12/911* (2013.01)
  *G06F 9/50* (2006.01)
  *H04L 12/927* (2013.01)

(52) U.S. Cl.
  CPC ...... *H04L 41/0896* (2013.01); *H04L 43/0894* (2013.01); *H04L 47/823* (2013.01)

(56) References Cited

U.S. PATENT DOCUMENTS

| | | | |
|---|---|---|---|
| 8,977,756 B2* | 3/2015 | Gill | H04L 67/2833 370/216 |
| 9,838,277 B2* | 12/2017 | Raney | H04L 43/028 |
| 9,917,793 B2* | 3/2018 | Liu | H04L 49/25 |
| 2004/0081092 A1† | 4/2004 | Rhee et al. | |
| 2014/0003232 A1* | 1/2014 | Guichard | H04L 67/16 370/230 |
| 2014/0281020 A1* | 9/2014 | Crisan | H04L 49/25 709/235 |
| 2014/0317261 A1† | 10/2014 | Shatzkamer et al. | |
| 2015/0295998 A1† | 10/2015 | Morrill et al. | |
| 2015/0370586 A1* | 12/2015 | Cooper | G06F 9/45533 710/308 |
| 2016/0080253 A1* | 3/2016 | Wang | H04L 12/6418 370/392 |
| 2016/0294732 A1* | 10/2016 | Chou | H04L 49/25 |
| 2016/0315830 A1* | 10/2016 | Cote et al. | H04L 41/5022 |
| 2016/0337202 A1* | 11/2016 | Ben-Itzhak | H04L 45/745 |
| 2016/0344637 A1* | 11/2016 | Saha | H04L 47/10 |
| 2017/0019335 A1* | 1/2017 | Schultz | H04L 43/0876 |
| 2017/0126792 A1* | 5/2017 | Halpern | H04L 41/0896 |
| 2017/0149665 A1* | 5/2017 | Yousaf | H04L 47/115 |
| 2017/0171026 A1* | 6/2017 | Lucas | G06F 11/1417 |
| 2017/0295247 A1* | 10/2017 | Llorca | H04L 67/16 |

OTHER PUBLICATIONS

Network Operators AT&T et al. "Network Functions Virtualisation—Introductory White Paper"; Issue 1; Oct. 22-24, 2014; retrieved from the internet: https://portal.etsi.org/nfv/nfv_white_paper.pdf; pp. 1-16.

Faraci, G. "A Processor-Sharing Scheduling Strategy for NFV Nodes", Research Article, Accepted Jan. 12, 2016; pp. 1-11, vol. 2016, Article ID 3583962, Journal of Electrical and Computer Engineering, Hindawi Publishing Corporation, XP-002770572, http://dx.doi.org/10.1155/2016/3583962.

Mijumbi, R. "Design and Evaluation of Algorithms for Mapping and Scheduling of Virtual Network Functions", IEEE 2015, pp. 1-9, University Politecnica de Catalunya, Barcelona, Spain, Ghent University—iMinds, Gent, Belgium, Telecommunications Software and Systems Group, Waterford Institute of Technology, Ireland.

Lombardo, A. "An Analytical Tool for Performance Evaluation of Software Defined Networking Services", IEEE 2014, pp. 1-7, DIEEI, University of Catania, Catania, Italy, Telecom Italia Strategy—Future Centre, Turin, Italy.

\* cited by examiner
† cited by third party

INTERCONNECTED HARDWARE INFRASTRUCTURE RESOURCE CONTROL

RELATED APPLICATIONS

This application claims the benefit of U.S. Provisional Patent Application 62/299,953, filed Feb. 25, 2016, which is hereby incorporated by reference in its entirety.

TECHNICAL FIELD

The present disclosure generally relates to controlling resource allocation and/or deallocation, and more specifically relates to a physical network node that controls allocation and/or deallocation of resources of an interconnected hardware infrastructure.

BACKGROUND

The general adoption of cloud computing has led to the deployment of a wide range of applications. In such cloud computing solutions, physical components are often shared among tenants. Such physical components may include, for example, compute nodes, processors, storage nodes, disks, and network fabrics. Each of these physical components contributes to the resources available to tenants. Such resources may include, e.g., processing, memory, and/or network resources. Virtualization principles may be applied to dynamically allocate and/or deallocate resources to particular tasks within the cloud. Pricing models adapted to such virtualized environments typically meter resource usage of individual tenants, thereby enabling each tenant to pay only for the resources actually allocated to them.

Network processing is a domain to which cloud computing and virtualization principles have previously been generally applied. In support of such network processing, network services may also be packaged on physical appliances and connected together via a physical network. These network services include interconnected network functions (NF) such as firewalls, deep packet inspectors, and transcoders, among others.

SUMMARY

Various embodiments of the present disclosure include computer-implemented methods, systems, apparatus, and/or non-transitory computer readable mediums storing computer program products. As will be discussed below, such embodiments generally relate to a physical network node that controls allocation and/or deallocation of one or more interconnected hardware infrastructure resources. For example, a plurality of serially-connected service nodes may support a packet flow using one or more resources of the interconnected hardware infrastructure, and the physical network node may control allocation of a resource to, or deallocation of a resource from, a service node at a future time based on network conditions determined with respect to that packet flow.

More particularly, embodiments of the present disclosure include a method, implemented by a physical network node controlling allocation and/or deallocation of resources of an interconnected hardware infrastructure. The method comprises determining a number of requests currently queued at a first service node of a plurality of serially-connected service nodes at a current time. The plurality of serially-connected service nodes supports a packet flow using resources of the interconnected hardware infrastructure. The method further comprises determining a packet flow rate of the packet flow into the first service node. The method further comprises determining a future time to control allocation or deallocation of a resource of the interconnected hardware infrastructure to a second service node of the plurality of serially-connected service nodes. The determining of the future time is based on the determined number of requests and the determined packet flow rate. The method further comprises controlling allocation or deallocation of the resource to the second service node at the future time.

Other embodiments include a physical network node. The physical network node comprises interface circuitry and processing circuitry communicatively coupled to the interface circuitry. The interface circuitry is configured to exchange signals with an interconnected hardware infrastructure. The processing circuitry is configured to determine a number of requests currently queued at a first service node of a plurality of serially-connected service nodes at a current time. The plurality of serially-connected service nodes supports a packet flow using resources of the interconnected hardware infrastructure. The processing circuitry is further configured to determine a packet flow rate of the packet flow into the first service node, and to determine a future time to control allocation or deallocation of a resource of the interconnected hardware infrastructure to a second service node of the plurality of serially-connected service nodes. The processing circuitry is configured to determine the future time based on the determined number of requests and the determined packet flow rate. The processing circuitry is further configured to control allocation or deallocation of the resource to the second service node at the future time via the interface circuitry.

Yet other embodiments include a non-transitory computer readable medium storing a computer program product for controlling a programmable physical network node. The computer program product comprises software instructions that, when executed by the programmable physical network node, cause the programmable physical network node to determine a number of requests currently queued at a first service node of a plurality of serially-connected service nodes at a current time. The plurality of serially-connected service nodes support a packet flow using resources of an interconnected hardware infrastructure. The software instructions further cause the programmable physical network node to determine a packet flow rate of the packet flow into the first service node, and determine a future time to control allocation or deallocation of a resource of the interconnected hardware infrastructure to a second service node of the plurality of serially-connected service nodes. Determining of the future time is based on the determined number of requests and the determined packet flow rate. The software instructions further cause the programmable physical network node to control the allocation or deallocation of the resource to the second service node at the future time.

Figure 2:
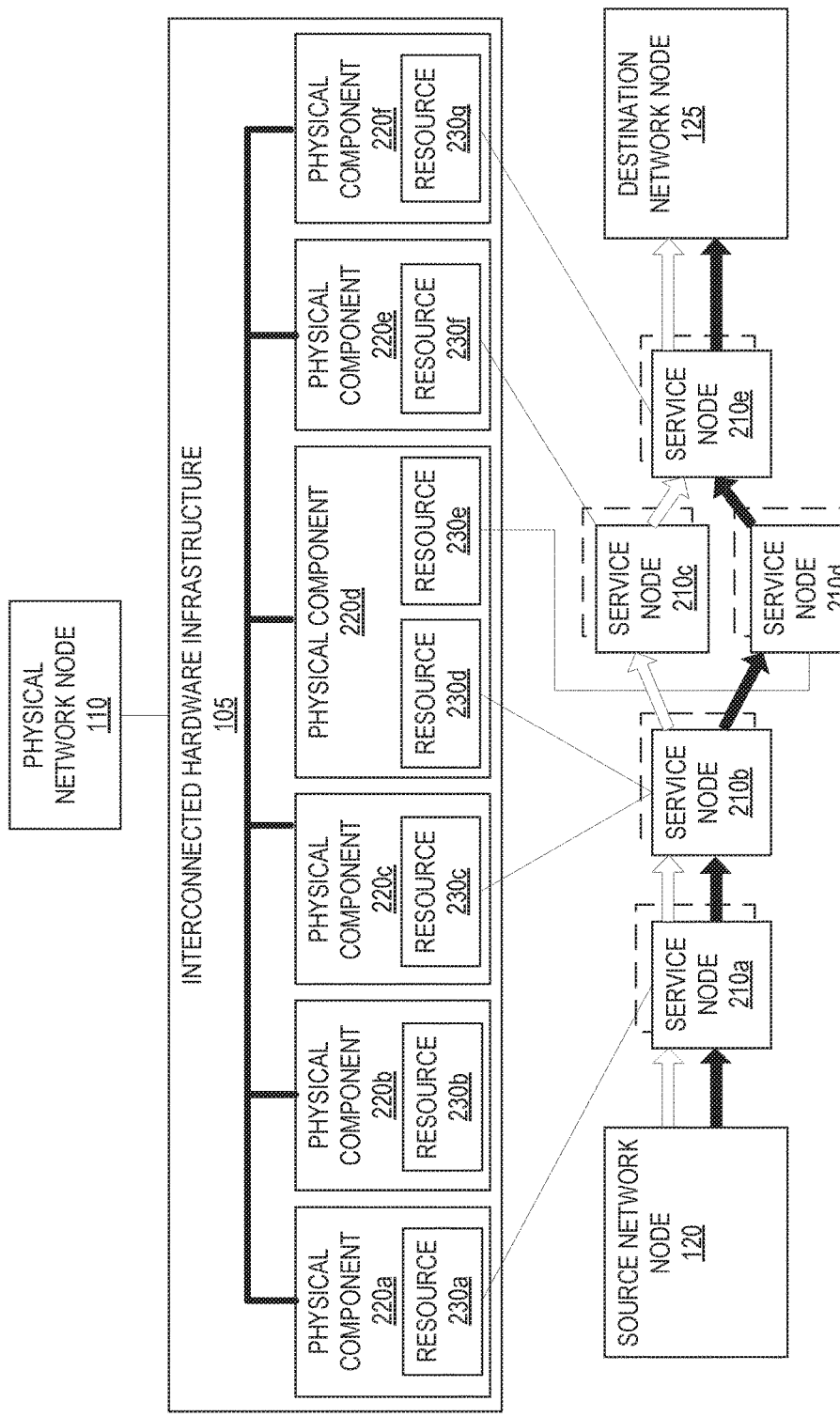
FIG. 2 is a block diagram illustrating resource allocation from a plurality of physical resources of an interconnected hardware infrastructure to service nodes in support of packets flows, according to one or more embodiments of the present disclosure.

Note that, as used herein, when a reference numeral comprises a letter designation in the drawings, discussion of a specific instance of an illustrated element will use the appropriate corresponding letter designation (e.g., physical component 220a of FIG. 2). However, the letter designation will be omitted in order to refer generically to the illustrated subject matter (e.g., discussion of a physical component 220 (generally), rather than discussion of particular physical components 220a, 220b).

DETAILED DESCRIPTION

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

According to embodiments herein, a physical network node controls the allocation or deallocation of a particular resource of an interconnected hardware infrastructure. For purposes of the present disclosure, a resource may be a physical component (such as a processor, disk, and/or network adapter), a logical partition of a physical component (such as some amount of computing time, storage capacity, and/or available bandwidth that is provided by one or more physical components), a logical grouping of physical components (e.g., an array of disks) and/or logical partitions thereof (5 terabytes of storage on an array of disks).

Figure 1:
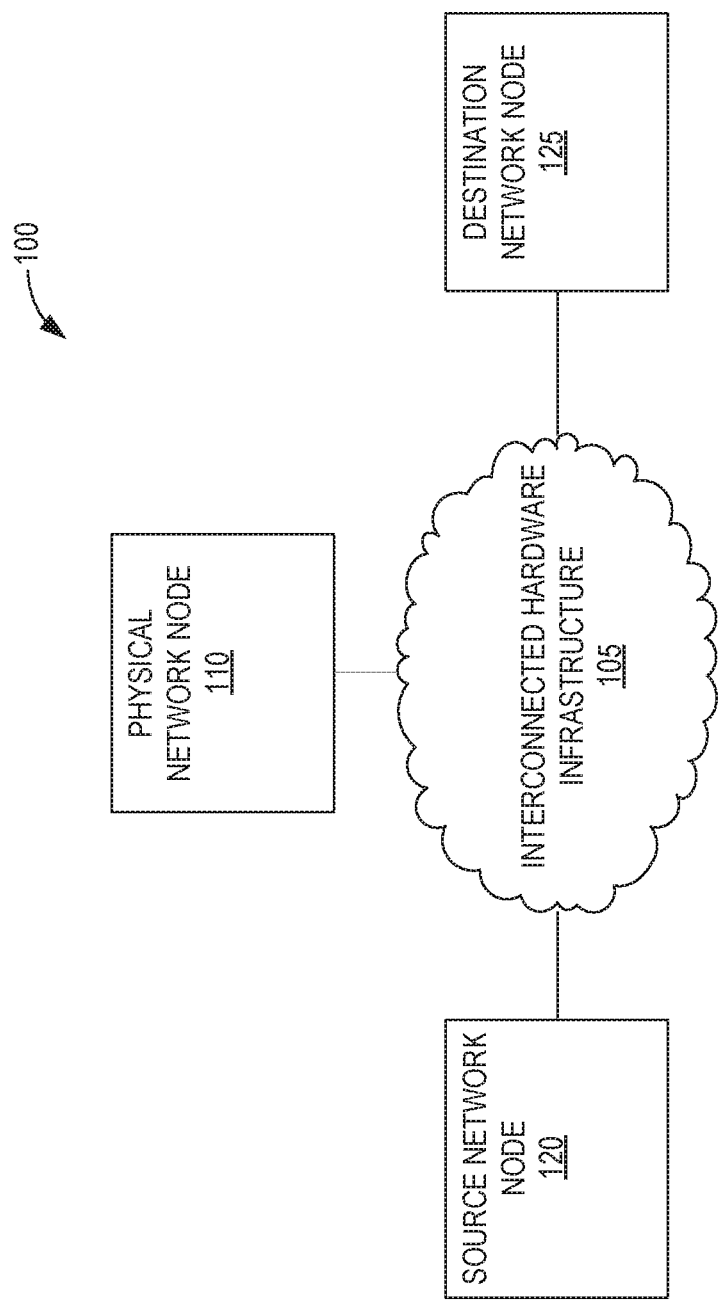
FIG. 1 is a block diagram of an example network environment, according to one or more embodiments of the present disclosure.

An example network environment 100 in which such a physical network node 110 and interconnected hardware infrastructure 105 may operate is illustrated in FIG. 1. The network environment 100 includes the physical network node 110, a source network node 120, a destination network node 125, and an interconnected hardware infrastructure 105. Although each of the source, destination, and physical network nodes in this example is communicatively connected to the interconnected hardware infrastructure 105, according to various embodiments, one or more of the nodes 110, 120, 125 are comprised within the interconnected hardware infrastructure 105 itself.

The physical network node 110 is configured to exchange signals with the interconnected hardware infrastructure 105 via a network. Examples of the physical network node 110 include a personal computer, a laptop computer, a desktop computer, a workstation, a smartphone, a tablet computer, a wearable computer, a server, a server cluster, a smart appliance, network attached storage, and a storage area network. According to various embodiments, the physical network node 110 executes a management service (e.g., a virtual machine running virtualization management software) to control allocation and/or deallocation of resources of the interconnected hardware infrastructure 105.

The interconnected hardware infrastructure 105 is capable of exchanging communication signals with the source network node 120 and the destination network node 125 and comprises physical components that are interconnected via a network. Examples of the network of the interconnected hardware infrastructure 105 include (but are not limited to) one or more of: the Internet (or a portion thereof); one or more local area networks; one or more wireless networks; one or more cellular networks; one or more Internet Protocol-based networks; one or more Ethernet networks; one or more optical networks; and/or one or more circuit switched networks. Such a network may comprise any number of networking devices such as routers, gateways, switches, hubs, firewalls, and the like (not shown in FIG. 1) supporting the exchange of such communication signals. In some embodiments, the interconnected hardware infrastructure 105 implements a Network Function Virtualization Infrastructure (NFVI).

FIG. 2 illustrates resources 230a-g of physical components 220a-f of an interconnected hardware infrastructure 105, some of which are allocated to service nodes 210a-e. As will be discussed further below, a service node 210a-e may be a virtual function executed using one or more resources 230a-g provided by one or more physical components 220a-f of the interconnected hardware infrastructure 105. These service nodes 210a-e may also execute using other resources (not shown) provided by other physical components (not shown) that are, for example, outside of the interconnected hardware infrastructure 105, according to particular embodiments.

Resource allocation and deallocation is under the control of physical network node 110. The resources 230a-g may generally be used by the service nodes 210 to support one or more packet flows between the source network node 120 and the destination node 125 at various times, as appropriate. In general, any service node 210a-e may be allocated any resource 230a-g provided by the interconnected hardware infrastructure 105, according to particular embodiments. Further, any such resource 230a-g, once allocated to a service node 210a-e, may subsequently be deallocated and either left unallocated, reallocated, or allocated to a different service node 210a-e, according to embodiments.

The physical components 220a-f may be (or may be comprised within) one or more personal computers, laptop computers, desktop computers, workstations, smartphones, tablet computers, wearable computers, servers, server clusters, mainframe computers, smart appliances, network attached storage (NAS) units, storage area networks (SANs), routers, gateways, switches, hubs, firewalls, processors, memory, disks, and/or network adapters, for example. According to embodiments, any physical component 220a-f may comprise any number of distinct resources 230. In the example of FIG. 2, physical components 220a-c and 220e-f each comprise a single resource 230a-c and 230f-g, respectively. Physical component 220d comprises resources 230d-e.

In general, a resource 230 may be allocated or unallocated. In the example of FIG. 2, resources 230a and 230c-g are allocated to services nodes 210a-e. Service node 210b is allocated resources 230c-d from more than one physical component 220c-d. Resource 230b is not allocated to any of the service nodes 210a-e. According to the example of FIG. 2, resource 230b is unallocated. In other embodiments, resource 230b may be allocated to a physical or logical node other than the service nodes 210a-e.

The service nodes 210a-e support packet flows between the source network node 120 and destination network node 125. In particular, service nodes 210a, 210b, 210c, and 210e are connected in series and support a first packet flow (illustrated in FIG. 2 by the white arrows). Within this first packet flow, packets are transmitted from the source network node 120 to destination network node 125. Similarly, serially-connected service nodes 210a, 210b, 210d, and 210e support a second packet flow in which packets are transmitted from source network node 120 to destination network node 125 (illustrated in FIG. 2 by the black arrows).

These service nodes 210a-e may, according to various embodiments, perform any form of network processing. For example, one or more of the service nodes 210a-e may comprise one or more service applications, virtual machines, firewalls, deep packet inspectors, transcoders, and/or IP Multimedia Systems (IMS). The network processing performed by one or more of the service nodes 210a-e may include any type of stream processing, e.g., to process at least part of a media stream comprised in one or more corresponding flows. Such stream processing may include the processing of video, audio, sensor data, and/or control signaling, for example. In some embodiments, one or more of the service nodes 210a-e may be virtual networking functions (VNFs). Each of the service nodes 210a-e may be instantiated any number of times and allocated resources 230 of the interconnected hardware infrastructure 105 by the physical network node 110, e.g., in order to support additional packet flows.

FIG. 2 is merely one example of how resources 230 from physical components 220 of an interconnected hardware infrastructure 105 may be allocated by a physical network node 110. Other examples may include fewer, different, or additional resources 230, physical components 220, allocations, service nodes 210, and/or packet flows.

Figure 3A:
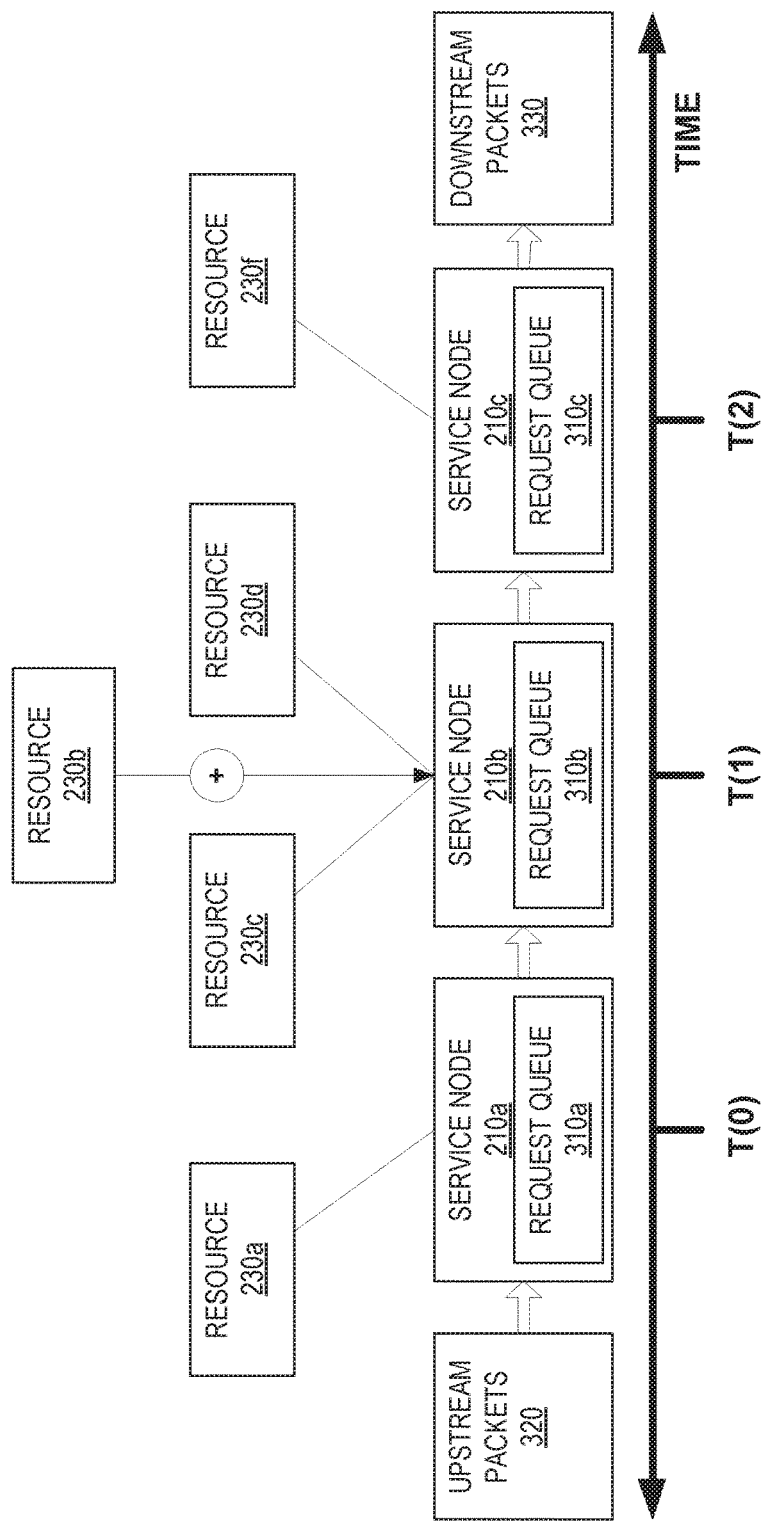
FIG. 3A is a block diagram illustrating an example of allocating a resource according to one or more embodiments of the present disclosure.

Control over allocation and deallocation of the resources 230a-g by the physical network node 110 may be responsive to particular networking conditions. FIG. 3A illustrates a portion of the first packet flow between the source network node 120 and destination network node 125 that was illustrated in FIG. 2. More particularly, FIG. 3A illustrates an example of allocating a resource 230b in response to network conditions at service node 210a supporting the previously described first packet flow.

As shown in FIG. 3A, upstream packets 320 originating from the source network node 120 (not shown) flow into service node 210a at time T(0), then to service node 210b at time T(1), then on to service node 210c at time T(2), then subsequently continue on as downstream packets 330 towards the destination network node 125 (not shown). Each of the service nodes 210a-c comprise a request queue 310a-c, respectively, in which requests to process at least some of these packets are queued. The length of each request queue 310a-c may be limited by the resource(s) 230a, 230c-d, 230f allocated to the corresponding service node 210a-c. For example, resource 230a may only provide a limited amount of storage in which request queue 310a can store requests.

In some embodiments, the requests in a particular request queue 310 are the packets themselves, and all packets are processed according to one or more services supported by the corresponding service node 210 (e.g., error correction, QoS classification, firewall services, transcoding). In other embodiments, some packets are processed according to services provided by a particular service node 210 while other packets are not. In such an example, the requests may be received from an upstream node and identify the packets to be processed. In other embodiments, the requests are generated by the service node 210 receiving the packets after identifying which packets require further processing (i.e., the requests may be an internal packet-tracking mechanism of the service node 210).

Generally, as the packet flow rate increases or decreases at a particular service node 210, the queue length at that service node 210 tends to correspondingly increase or decrease, respectively. The queue length at a service node 210 may also change for other reasons. For example, allocation or deallocation of certain resources 230 from a service node 210 may render the service node 210 more or less capable of timely handling packet processing requests. Unless some corrective or mitigating action is taken, increased queue lengths tend to increase delays for the packet flow overall. Conversely, reduced queue lengths tend to reduce such delays. For example, as the length of request queue 310a increases or decreases, both of the values of T(1) and T(2) would generally tend to increase or decrease, respectively. Similarly, as the length of request queue 310b increases or decreases, the value of T(2) also tends to increase or decrease, respectively.

According to the example illustrated in FIG. 3A, at time T(0), physical network node 110 determines that the number of requests to process packets in request queue 310a has exceeded a threshold queue size. Those packets to be processed at service node 210a are expected to subsequently arrive at service node 210b and impact request queue 310b. Accordingly, in response to determining that the number of requests in request queue 310a has exceeded the threshold queue size, the physical network node 110 allocates resource 230b to service node 210b. Such allocation may, e.g., prevent the congestion occurring at service node 210a from propagating to service node 210b and increasing overall packet flow delay beyond a maximum delay configured for the packet flow.

In general, the allocation of resources 230 of the interconnected hardware infrastructure 105 generally imposes at least some cost. For example, the allocation of resource 230b to service node 210b may render resource 230b unavailable for allocation to service nodes 210a and 210c. Accordingly, in some embodiments, the physical network node 110 determines the threshold queue size of one or more of the request queues 310a-c based on a minimum amount of resources 230 of the interconnected hardware infrastructure 105 required to support the packet flow in accordance with the above-discussed maximum delay configured for the packet flow. Thus, the physical network node 110 may, for example, configure the threshold queue size of request queue 310a such that the physical network node 110 is triggered to allocate such resources 230 as may be necessary and available to prevent the maximum delay for the packet flow from being exceeded (in this example, resource 230b). Similarly, the physical network node 110 may configure the threshold queue size of request queue 310a such that the physical network node 110 is triggered to deallocate such resources 230 as may be allocated and unnecessary to prevent the maximum delay for the packet flow from being exceeded, according to embodiments.

Resource 230b in particular may be selected by the physical network node 110 for allocation to service node 210b for a variety of reasons. For example, resource 230b may be allocated to service node 210b to increase the storage capacity of the request queue 310b by a particular amount. For another example, resource 230b may be allocated to service node 210b to provide additional processing capacity that service node 210b can use to more quickly process queued requests. The selection of resource 230b, as opposed to some other resource 230a, 230c-g may be based on what types of resources will be effective for preventing the propagation of congestion to service node 210b, e.g., in view of the other resources 230c-d already allocated to service node 210b.

Although the allocation of resource 230b to service node 210b generally serves to mitigate overall packet delay in response to detecting that service nodes 210b and 210c will soon be subject to additional packet traffic, how soon the additional packet traffic will unsatisfactorily impact, e.g., request queue 310b may depend on various factors. For example, the number of requests already in request queue 310b may contribute to overall delay. Thus, if a high number of requests are in request queue 310b at time T(0), resource 230b may be needed by service node 210b very shortly thereafter. In contrast, if the number of requests in request queue 310b is quite small at time T(0), resource 230b may not be needed by service node 210b for a relatively longer period of time. Accordingly, the physical network node 110 refrains from controlling allocation of resource 230b at time T(0), and instead controls the allocation of resource 230b at a future time. By refraining from immediately controlling allocation, the physical network node 110 may, for example, avoid tying up resource 230b before it is required to keep the packet flow delay below the configured maximum delay. Such refraining may maximize the availability of resource 230b and/or mitigate certain operating costs associated therewith.

In determining the time to control allocation of resource 230b, the physical network node 110 may additionally or alternatively consider that physical component 220b (which corresponds to resource 230b) and/or service node 210b (to which resource 230b will be assigned) may not be immediately available at time T(0). In such a scenario, even if allocation of resource 230b were desired at time T(0) (i.e., at the time when the physical network node 110 detects that the number of requests at request queue 310a has exceeded its threshold queue size), the physical component 220b and/or service node 210b may be incapable of responding that quickly. For example, physical component 220b (corresponding to resource 230b) may be a physical server that is powered down or sleeping at time T(0). In such an example, the physical network node 110 may need to send a power on request and/or command to physical component 220b, and give that physical component 220b time to start up before resource 230b can be allocated. In another example, resource 230b may be allocated to some other service node 210, and may require time to complete a task currently being performed before the allocation of resource 230b can be modified. In yet another example, service node 210b may be a virtual machine that has not yet been started, is paused, or is sleeping and may require time to start up. Indeed, the scenarios in which the physical component 220b and/or service node 210b may not be immediately available are potentially myriad, and the physical network node 110 may determine the future time to control allocation based on such factors, either in whole or in part.

Accordingly, in some embodiments, the physical network node 110 determines a future time to control allocation of resource 230b based on the number of requests determined to be currently queued at service node 210a, and a packet flow rate determined to be flowing into service node 210a. In some embodiments, the determining of the future time is additionally or alternatively based on the resources 230a and/or 230c-d used by service nodes 210a, 210b, and/or 210c. In some embodiments, the determining of the future time is additionally or alternatively based on the threshold queue size of request queue 310a and/or 310b. Other combinations of factors, including timings, delays, and/or resource allocations may additionally or alternatively be considered in determining the future time for resource 230 allocation. Further, such factors may be relevant to one, some, or all of the service nodes 210a-e.

Figure 3B:
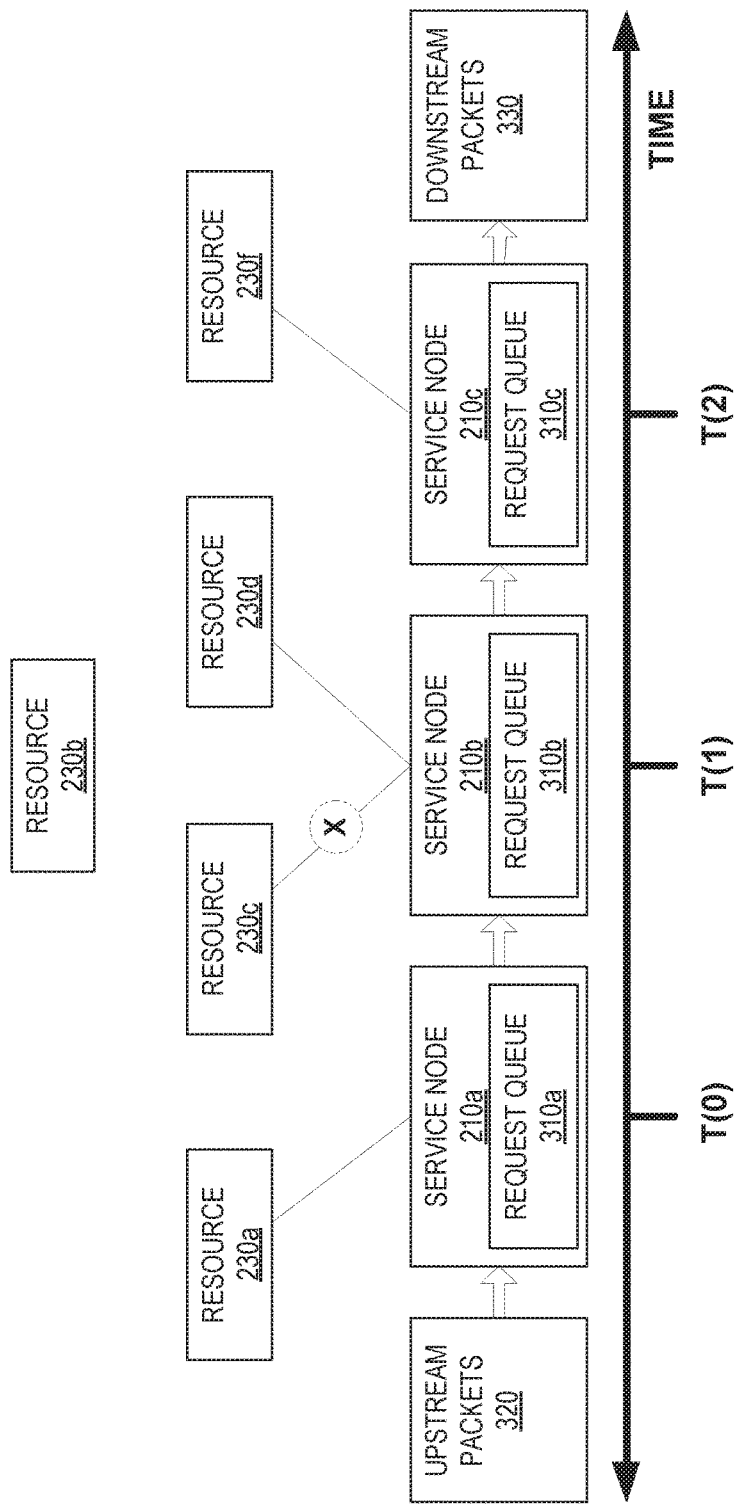
FIG. 3B is a block diagram illustrating an example of deallocating a resource according to one or more embodiments of the present disclosure.

In contrast to FIG. 3A, which illustrated an example of controlling allocation of a resource 230b to a service node 210b, FIG. 3B illustrates an example of controlling deallocation of a resource 230c from service node 210b. In this example, the physical network node 110 determines the number of requests currently queued (i.e., at time T(0)) in request queue 310a, and further determines a packet flow rate of the packet flow into service node 210a. Based on the determined number of requests and the determined packet flow rate, the physical network node 110 further determines a future time to control deallocation of resource 230c. This future time may, for example, free resource 230c for allocation to one or more of the other service nodes 210a, 210c-e, or may enable the corresponding physical component 220c to enter a reduced power mode, among other things.

In some embodiments, the physical network node 110 controls deallocation of resource 230c in response to determining that the number of requests at request 310a is below a threshold queue size. As previously discussed, the physical network node 110 may determine and/or configure the threshold queue size based on a minimum amount of resources 230 required to support the packet flow in accordance with a maximum delay configured for the packet flow through the service nodes 210a-c, 210e supporting that packet flow. Accordingly, in some embodiments, the physical network node 110 controls deallocation of resource 230c at a time in the future (i.e., after time T(0)) in which the reduced resources available to service node 210b will not cause the overall delay of packets through the service nodes 210a-c, 210e to exceed the above discussed maximum delay. In some embodiments, this deallocation is subsequent to a previous allocation, such as discussed in the example above with respect to FIG. 3A. In some embodiments, the physical network node 110 may consider similar factors in order to determine which of allocation or deallocation is appropriate at a future time, if at all, in response to the network conditions at one or more of the service nodes 210a-e.

Figure 4:
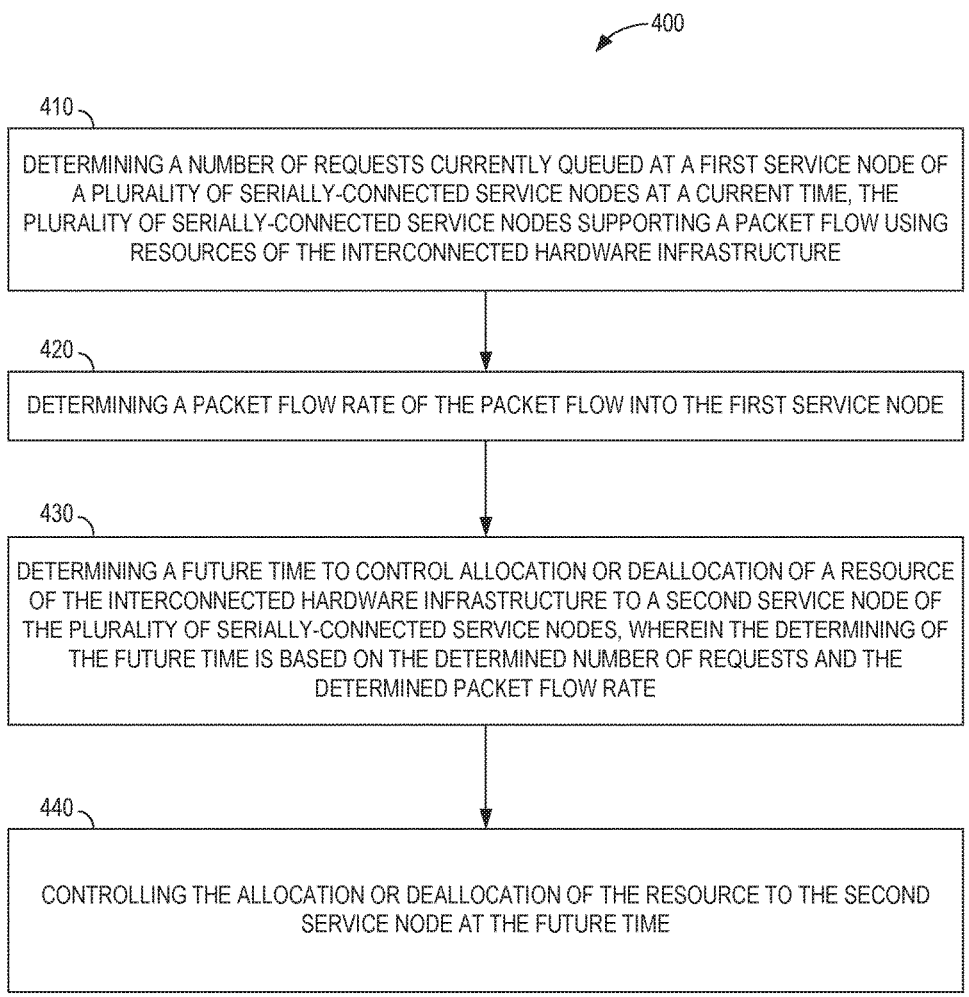
FIG. 4 is a flow diagram illustrating an example method implemented in a physical network node, according to one or more embodiments of the present disclosure.

In view of the above, FIG. 4 illustrates a method 400 implemented by a physical network node 110. The physical network node 110 controls allocation and/or deallocation of resources 230a-g of an interconnected hardware infrastructure 105. The method 400 comprises determining a number of requests currently queued at a first service node 210a of a plurality of serially-connected service nodes 210a-c, 210e at a current time (block 410). The plurality of serially-connected service nodes 210a-c, 210e supports a packet flow using resources 230a, 230c-d, 230f-g, of the interconnected hardware infrastructure 105. The method 400 further comprises determining a packet flow rate of the packet flow into the first service node 230*a* (block 420). The method 400 further comprises determining a future time to control allocation or deallocation of a resource (230*b* or 230*c*, respectively) of the interconnected hardware infrastructure 105 to a second service node 210*b* of the plurality of serially-connected service nodes 210*a-c*, 210*e* (block 430). The determining of the future time is based on the determined number of requests and the determined packet flow rate. The method 400 further comprises controlling allocation or deallocation of the resource (230*b* or 230*c*, respectively) to the second service node 210*b* at the future time (block 440).

Figure 5:
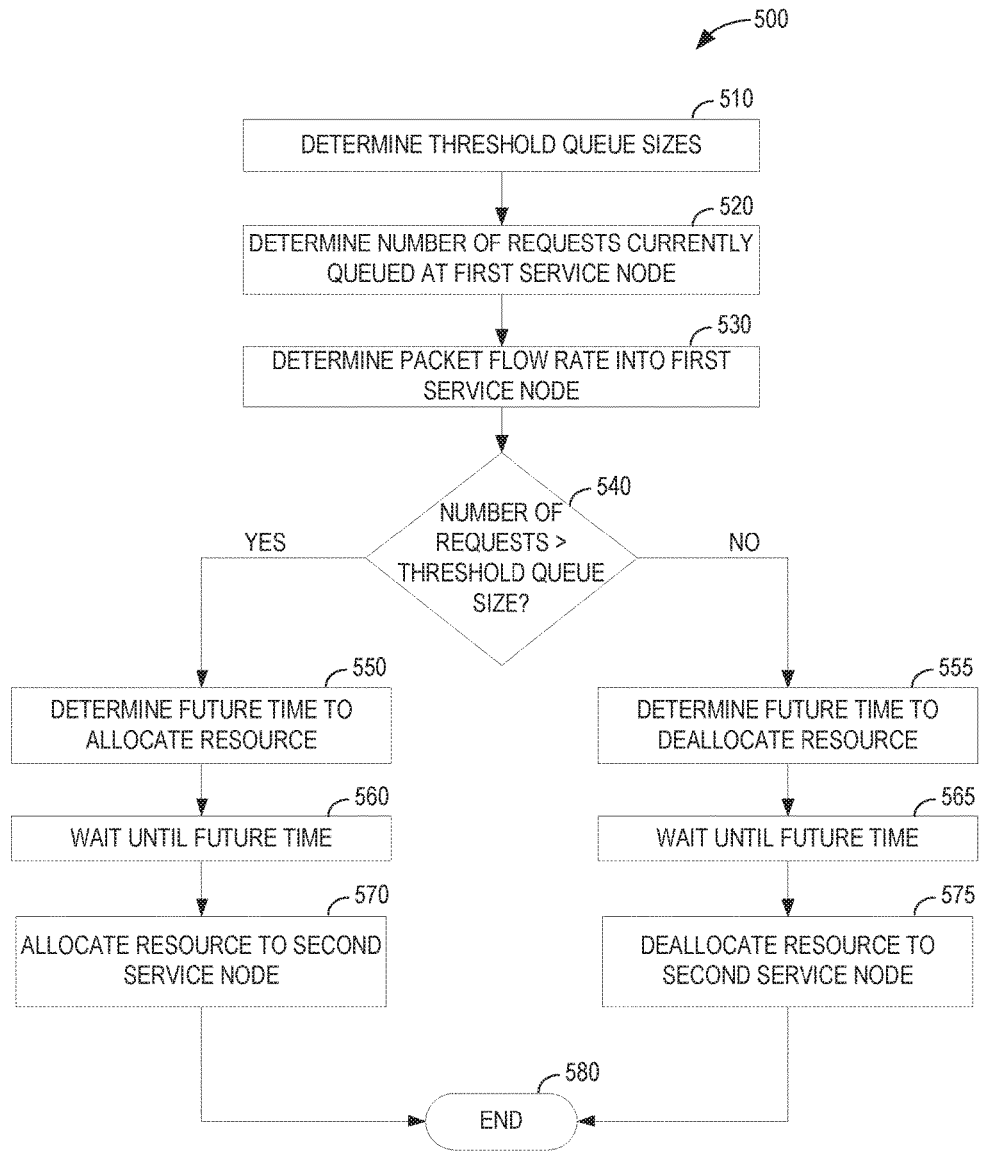
FIG. 5 is a flow diagram illustrating a more detailed example method implemented in a physical network node, according to one or more embodiments of the present disclosure.

FIG. 5 illustrates a more detailed method 500 implemented by a physical network node 110 controlling allocation and/or deallocation of resources 230*a-g* of an interconnected hardware infrastructure 105. According to method 500, the physical network node 110 determines threshold queue sizes for a plurality of serially-connected service nodes 210*a-c*, 210*e* supporting a packet flow using resources 230*a*, 230*c-d*, 230*f-g* of the interconnected hardware infrastructure 105 (block 510). As discussed above, the threshold queue sizes may be based on a minimum amount of resources 230 of the interconnected hardware infrastructure 105 required to support the packet flow in accordance with a maximum delay configured for the packet flow through the plurality of serially-connected service nodes 210*a-c*, 210*e*. The physical network node 110 then determines a number of requests currently queued at a first service node 210*a* (block 520) and determines a packet flow rate into that first service node 210*b* (block 530). The physical network node 110 then determines whether the number of requests exceeds or is below the threshold queue size determined for the first service node 210*a* (block 540).

In response to the number of requests exceeding the threshold queue size for the first service node 210*a* (block 540, yes), the physical network node 110 determines a future time to allocate a resource 230*b* to a second service node 210*b* (block 550). The determination of the future time is based on the determined number of requests at the first service node 210*a* and the determined packet flow rate into the first service node 210*a*. The physical network node 110 then waits until the future time (block 560) and allocates resource 230*b* to the second service node 210*b* at that future time (block 570). The method 500 then ends (block 580).

In response to the number of requests being below the threshold queue size for the first service node 210*a* (block 540, no), the physical network node 110 determines a future time to deallocate a resource 230*c* from a second service node 210*b* (block 555). The determination of the future time is based on the determined number of requests at the first service node 210*a* and the determined packet flow rate into the first service node 210*a*. The physical network node 110 then waits until the future time (block 565) and deallocates resource 230*c* from the second service node 210*b* at that future time (block 575). The method 500 then ends (block 580).

In the discussion above, various examples involved determining network conditions at a current time for service node 210*a* and controlling allocation or deallocation of a resource (230*b*, 230*c*, respectively) at a future time for service node 210*b*. Other embodiments may involve other service nodes 210 and/or other resources 230. For example, other embodiments may determine network conditions at a current time for service node 210*c* and control allocation or deallocation of a resource (230*b*, 230*a*, respectively) at a future time at service node 210*a*. Yet other embodiments may determine network conditions at service node 210*b* and control resource allocation or deallocation for service nodes 210*a-c*. Yet other embodiments may determine network conditions relevant to each of the service nodes 210*a-c*, 210*e* of a first flow, and each of the service nodes 210*a-b*, 210*d-e* of a second flow. Such embodiments may control allocation or dellocation of resources 230*a-g* for one or more of the service nodes 210*a-e* at respective future times.

Figure 6:
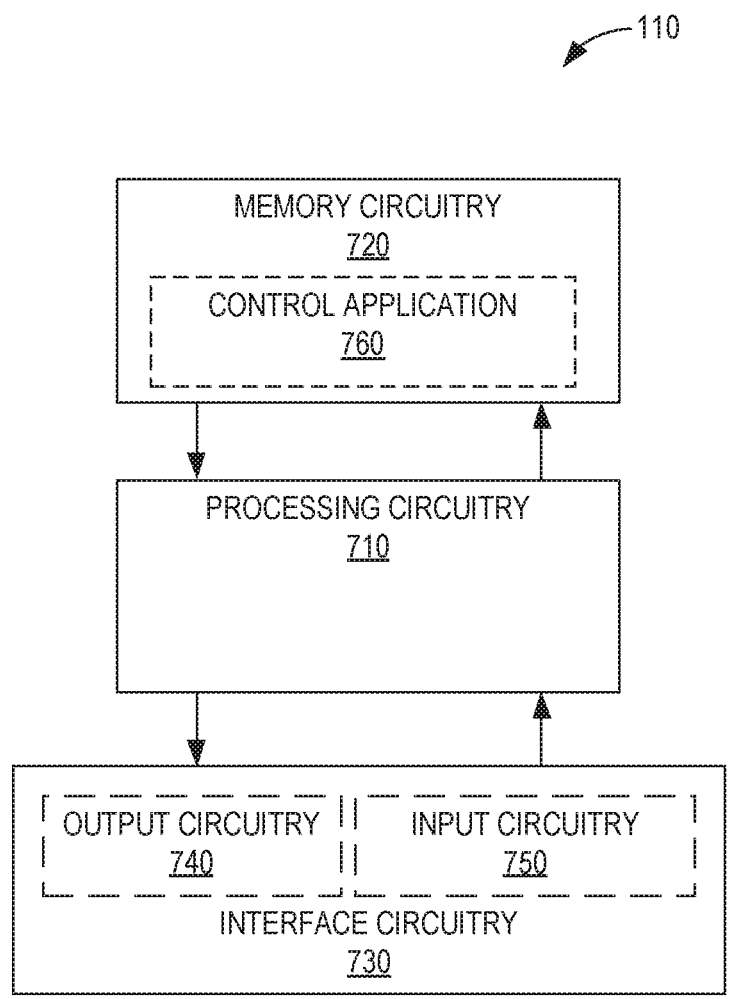
FIG. 6 is a block diagram illustrating example hardware of a physical network node, according to one or more embodiments of the present disclosure.

Other embodiments of the present disclosure include the physical network node 110 illustrated in FIG. 6. In the example of FIG. 6, the physical network node 110 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. Such a machine-readable computer program 760 may be a virtual machine, service application, virtual management node, for example. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals with the interconnected hardware infrastructure 105 and/or data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and/or Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and/or keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network 105) and input circuitry 750 (e.g., receiver circuitry configured to receive communication signals over the communications network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the physical network node 110 illustrated in FIG. 6, the interface circuitry 730 is configured to exchange signals with an interconnected hardware infrastructure 105. The processing circuitry 710 is configured to determine a number of requests currently queued at a first service node 210*a* of a plurality of serially-connected service nodes 210*a-c*, 210*e* at a current time. The plurality of serially-connected service nodes 210*a-c*, 210*e* supports a packet flow using resources 230*a*, 230*c-d*, 230*f-g* of the interconnected hardware infrastructure 105. The processing circuitry 710 is further configured to determine a packet flow rate of the packet flow into the first service node 210*a*, and to determine a future time to control allocation or deallocation of a resource (230*b*, 230*c*, respectively) of the interconnected hardware infrastructure 105 to a second service node 210*b* of the plurality of serially-connected service nodes 210*a-c*, 210*e*. The processing circuitry 710 is configured to determine the future time based on the determined number of requests and the determined packet flow rate. The processing circuitry 710 is further configured to control allocation or deallocation of the resource (230*b*, 230*c*, respectively) to the second service node 210*b* at the future time via the interface circuitry 730.

Other embodiments of the present disclosure include a non-transitory computer readable medium 720 storing a computer program product 760 for controlling a programmable physical network node 110, the computer program product 760 comprising software instructions that, when executed on the programmable physical network node 110, cause the programmable physical network node 110 to determine a number of requests currently queued at a first service node 210*a* of a plurality of serially-connected service nodes 210*a-c*, 210*e* at a current time. The plurality of serially-connected service nodes 210*a-c*, 210*e* supports a packet flow using resources 230*a*, 230*c-d*, 230*f-g* of the interconnected hardware infrastructure 105. The software instructions of the computer program product 760 further cause the physical network node 110 to determine a packet flow rate of the packet flow into the first service node 210*a*, and to determine a future time to control allocation or deallocation of a resource (230*b*, 230*c*, respectively) of the interconnected hardware infrastructure 105 to a second service node 210*b* of the plurality of serially-connected service nodes 210*a-c*, 210*e*. The software instructions of the computer program product 760 cause the physical network node 110 to determine the future time based on the determined number of requests and the determined packet flow rate. The software instructions of the computer program product 760 further cause the physical network node 110 to control allocation or deallocation of the resource (230*b*, 230*c*, respectively) to the second service node 210*b* at the future time via the interface circuitry 730.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a physical network node controlling allocation and/or deallocation of resources of an interconnected hardware infrastructure, the method comprising:
   determining a number of requests currently queued at a first service node of a plurality of serially-connected service nodes at a current time, the plurality of serially-connected service nodes supporting a packet flow using resources of the interconnected hardware infrastructure;
   determining a packet flow rate of the packet flow into the first service node;
   determining a future time to control allocation or deallocation of a resource of the interconnected hardware infrastructure to a second service node of the plurality of serially-connected service nodes, wherein the determining of the future time is based on the determined number of requests and the determined packet flow rate;
   controlling the allocation or deallocation of the resource to the second service node at the future time.

2. The method of claim 1, wherein the determining of the future time is further based on resources utilized by a third service node of the plurality of serially-connected service nodes.

3. The method of claim 2, wherein the first, second, and third service nodes are the same.

4. The method of claim 1, wherein controlling the allocation or deallocation of the resource at the future time comprises requesting the allocation of the resource at the future time responsive to determining that the determined number of requests exceeds a threshold queue size.

5. The method of claim 4, further comprising determining the threshold queue size based on a minimum amount of resources of the interconnected hardware infrastructure required to support the packet flow in accordance with a maximum delay configured for the packet flow through the plurality of serially-connected service nodes.

6. The method of claim 1, wherein controlling the allocation or deallocation of the resource at the future time comprises requesting the deallocation of the resource at the future time responsive to determining that the determined number of requests is below a threshold queue size.

7. The method of claim 6, further comprising determining the threshold queue size based on a minimum amount of resources of the interconnected hardware infrastructure required to support the packet flow in accordance with a maximum delay configured for the packet flow through the plurality of serially-connected service nodes.

8. The method of claim 1, wherein each of the plurality of serially-connected service nodes is a virtual network function (VNF) that is mapped to particular physical hardware of the interconnected hardware infrastructure.

9. The method of claim 1, wherein the plurality of serially-connected service nodes supporting a packet flow comprises at least one of the plurality of serially-connected service nodes processing at least part of a media stream comprised in the packet flow.

10. A physical network node controlling allocation and/or deallocation of resources of an interconnected hardware infrastructure, the physical network node comprising:
    interface circuitry configured to exchange signals with the interconnected hardware infrastructure;
    processing circuitry communicatively coupled to the interface circuitry and configured to:
       determine a number of requests currently queued at a first service node of a plurality of serially-connected service nodes at a current time, the plurality of serially-connected service nodes supporting a packet flow using resources of the interconnected hardware infrastructure;

determine a packet flow rate of the packet flow into the first service node;

determine a future time to control allocation or deallocation of a resource of the interconnected hardware infrastructure to a second service node of the plurality of serially-connected service nodes, wherein the determining of the future time is based on the determined number of requests and the determined packet flow rate;

control the allocation or deallocation of the resource to the second service node at the future time.

11. The physical network node of claim 10, wherein the processing circuitry is configured to determine the future time further based on resources utilized by a third service node of the plurality of serially-connected service nodes.

12. The physical network node of claim 11, wherein the first, second, and third service nodes are the same.

13. The physical network node of claim 10, wherein to control the allocation or deallocation of the resource at the future time, the processing circuitry is configured to request the allocation of the resource at the future time responsive to determining that the determined number of requests exceeds a threshold queue size.

14. The physical network node of claim 13, wherein the processing circuitry is further configured to determine the threshold queue size based on a minimum amount of resources of the interconnected hardware infrastructure required to support the packet flow in accordance with a maximum delay configured for the packet flow through the plurality of serially-connected service nodes.

15. The physical network node of claim 10, wherein to control the allocation or deallocation of the resource at the future time, the processing circuitry is configured to request the deallocation of the resource at the future time responsive to determining that the determined number of requests is below a threshold queue size.

16. The physical network node of claim 15, wherein the processing circuitry is further configured to determine the threshold queue size based on a minimum amount of resources of the interconnected hardware infrastructure required to support the packet flow in accordance with a maximum delay configured for the packet flow through the plurality of serially-connected service nodes.

17. The physical network node of claim 10, wherein each of the plurality of serially-connected service nodes is a virtual network function (VNF) that is mapped to particular physical hardware of the interconnected hardware infrastructure.

18. The physical network node of claim 10, wherein the plurality of serially-connected service nodes supporting a packet flow comprises at least one of the plurality of serially-connected service nodes processing at least part of a media stream comprised in the packet flow.

19. A non-transitory computer readable medium storing a computer program product for controlling a programmable physical network node, the computer program product comprising software instructions that, when executed by the programmable physical network node, cause the programmable physical network node to:

determine a number of requests currently queued at a first service node of a plurality of serially-connected service nodes at a current time, the plurality of serially-connected service nodes supporting a packet flow using resources of an interconnected hardware infrastructure;

determine a packet flow rate of the packet flow into the first service node;

determine a future time to control allocation or deallocation of a resource of the interconnected hardware infrastructure to a second service node of the plurality of serially-connected service nodes, wherein the determining of the future time is based on the determined number of requests and the determined packet flow rate;

control the allocation or deallocation of the resource to the second service node at the future time.

20. The non-transitory computer readable medium of claim 19, wherein to control the allocation or deallocation of the resource at the future time, the software instructions cause the programmable physical network node to:

request the allocation of the resource at the future time responsive to determining that the determined number of requests exceeds a threshold queue size; or request the deallocation of the resource at the future time responsive to determining that the determined number of requests is below a threshold queue size.

* * * * *